United States Patent
Hirayama et al.

(10) Patent No.: US 6,461,445 B1
(45) Date of Patent: Oct. 8, 2002

(54) METHOD OF FINISHING GLASS SUBSTRATE

(75) Inventors: Yoshio Hirayama, Shizuoka; Masao Kawaguchi; Toshimichi Morizane, both of Tokyo; Tadao Tokushima, Kanagawa, all of (JP)

(73) Assignee: Unip Corporation Co., Ltd., Tokyo (JP)

( * ) Notice: Subject to any disclaimer, the term of this patent is extended or adjusted under 35 U.S.C. 154(b) by 0 days.

(21) Appl. No.: 09/481,504

(22) Filed: Jan. 12, 2000

(30) Foreign Application Priority Data

Jan. 12, 1999 (JP) ............................. 11-005296

(51) Int. Cl.$^7$ ................................. B08B 3/04
(52) U.S. Cl. ............... 134/36; 134/26; 134/28; 134/29; 134/41; 134/42; 205/746
(58) Field of Search ............... 205/746; 134/36, 134/26, 28, 29, 41, 42

(56) References Cited

U.S. PATENT DOCUMENTS 6,039,815 A * 3/2000 Yeol et al. ...................... 134/2
6,048,466 A * 4/2000 Morizane et al. .............. 216/24

FOREIGN PATENT DOCUMENTS

GB 2294590 A * 5/1996

OTHER PUBLICATIONS

Yamanaka, et al. "Electrolyzed Water as the Novel Cleaning Media in Ultra–Large–Scale Integration and Liquid–Crystal Display Manufacturing". Langmuir (1999), 15 (12), 4165–4170.*

Aoki et al. "Wafer Treatment Using Electrolysis–Ionized Water", Jpn. J. Appl. Phys. vol. 33 (1994), 5686–5689.*

* cited by examiner

*Primary Examiner*—Sharidan Carrillo
(74) *Attorney, Agent, or Firm*—Oblon, Spivak, McClelland, Maier & Neustadt, P.C.

(57) ABSTRACT

A glass substrate is cleaned by contacting a preliminarily polished glass surface with functional water having a positive ORP potential for a predetermined period of time in the last rinsing step in order to repair the structure of the glass so as to achieve higher surface hardness and improved corrosion resistance.

6 Claims, 10 Drawing Sheets

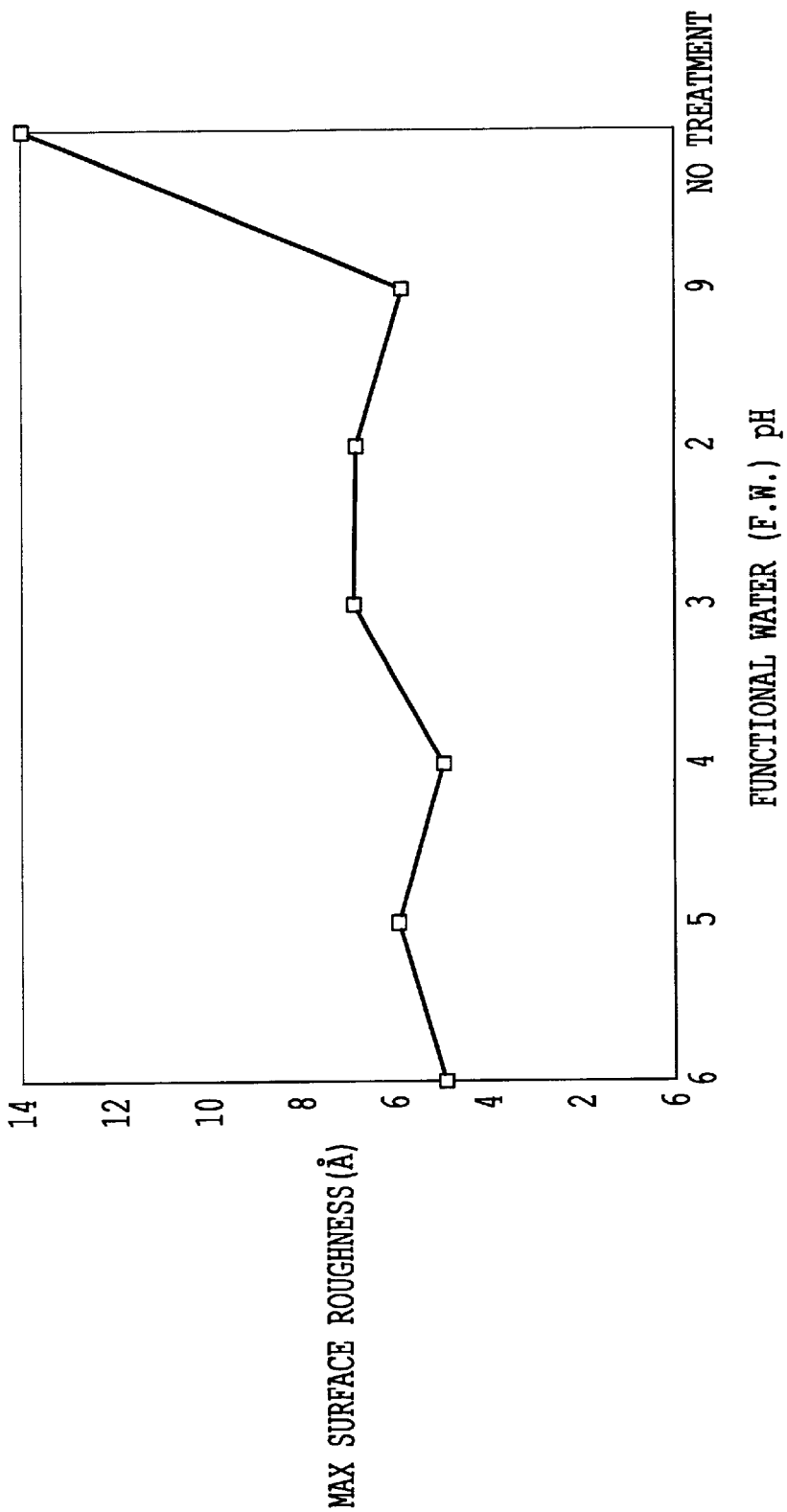

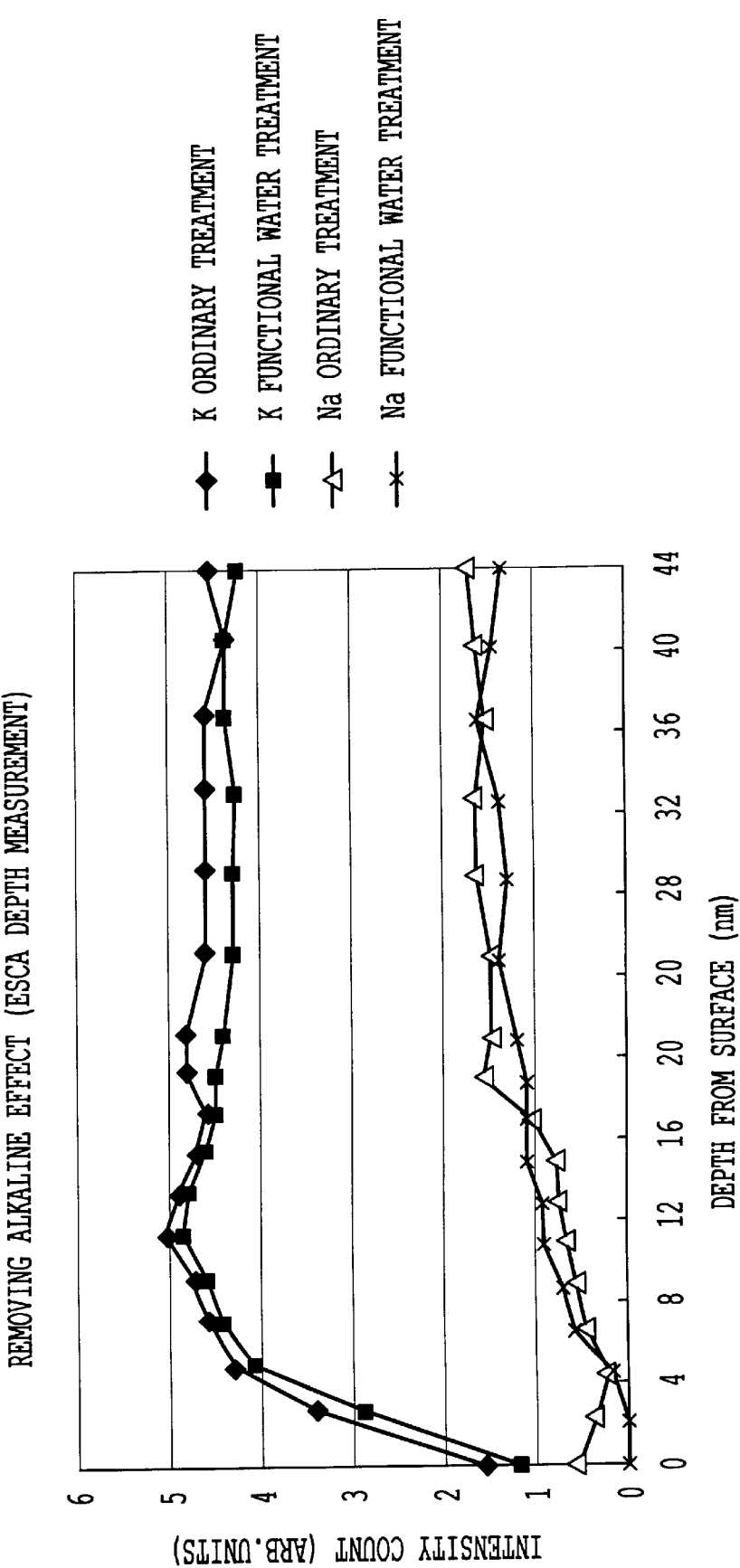

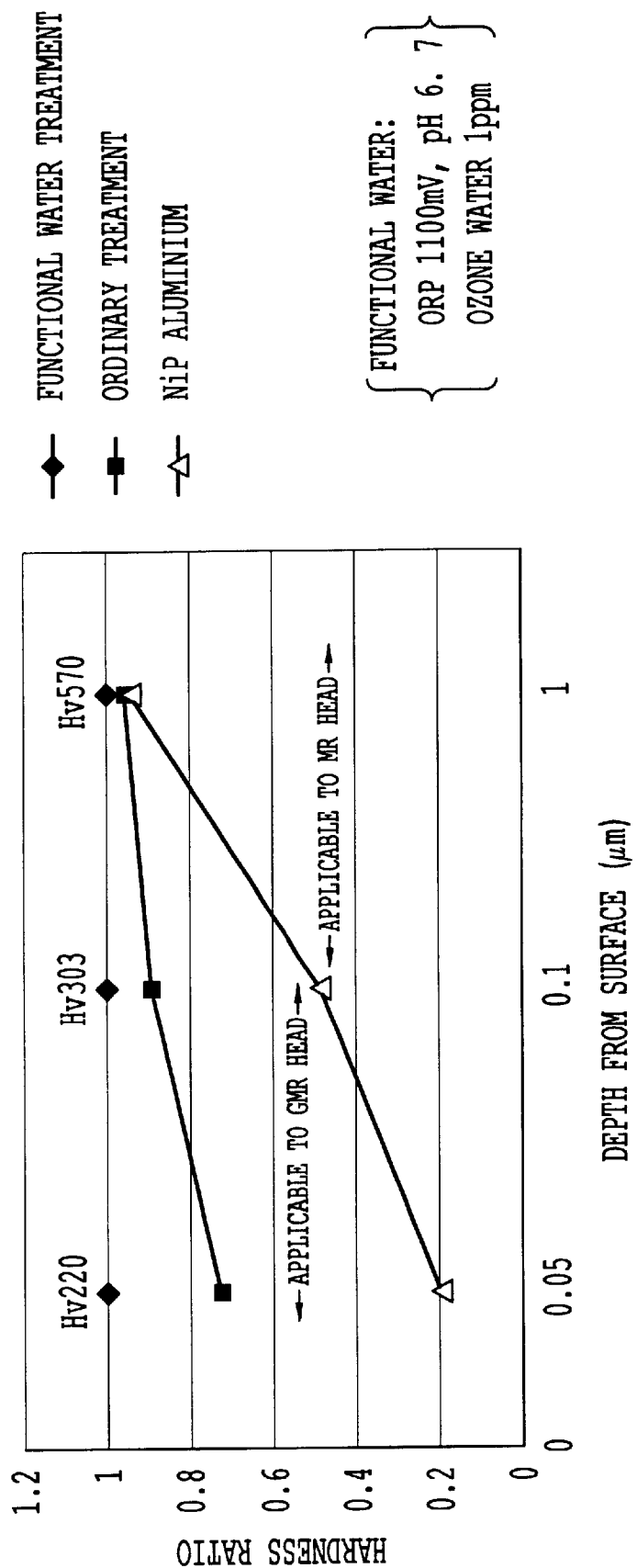

NO IONIC STRENGTHENED GLASS, ORDINARY TREATMENT

Y AXIS: PHOTON ELECTRON COUNT
X AXIS: BINDING ENERGY (eV)

IONIC STRENGTHENED GLASS, ORDINARY TREATMENT

IONIC STRENGTHENED GLASS, ORDINARY TREATMENT

IONIC STRENGTHENED GLASS, FUNCTIONAL WATER TREATMENT

IONIC STRENGTHENED GLASS, FUNCTIONAL WATER TREATMENT (PRIOR ART 1)
AFM PHOTOGRAPH AFTER 1 MONTH HOLD IN CLEAN ROOM

X 20.000 μm/div
Z 200.000 nm/div

ZINC GLASS: AFM PHOTOGRAPH AFTER 6 MONTH

NANO SCOPE    TAPPING AFM
SCAN SIZE     20.00μm
SETPOINT      1.533 V
SCAN RATE     1.001 Hz
NUMBER OF SAMPLES   512

☐ VIEW ANGLE
☼ LIGHT ANGLE 0 deg

X 5.000 μm/div
Z 10.000 nm/div

FUTATSUGI FGT 98/5/12   Ra=0.514nw
fgt.001

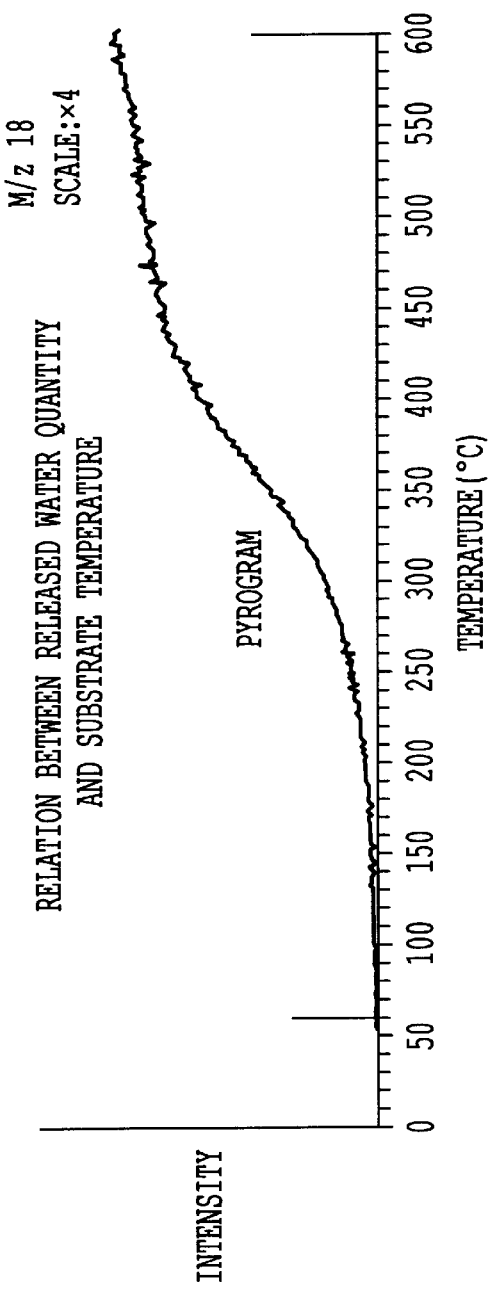
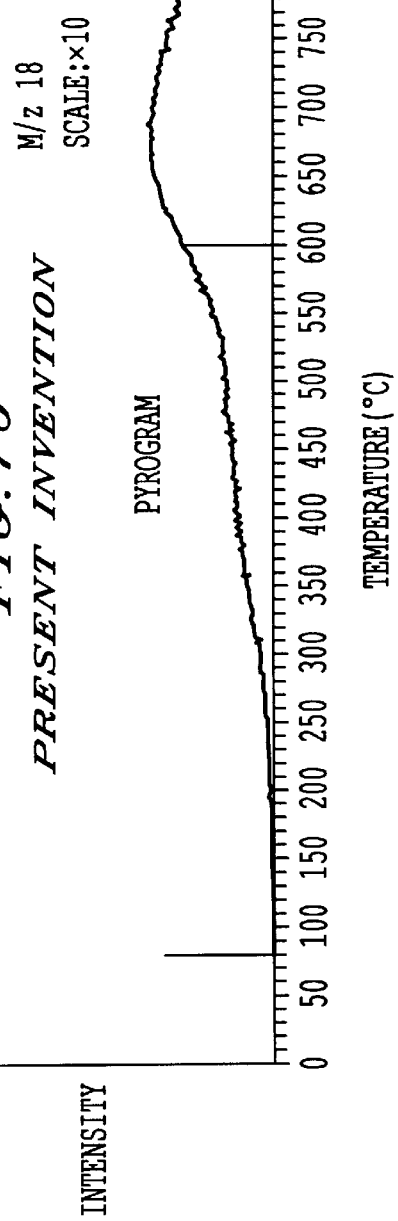

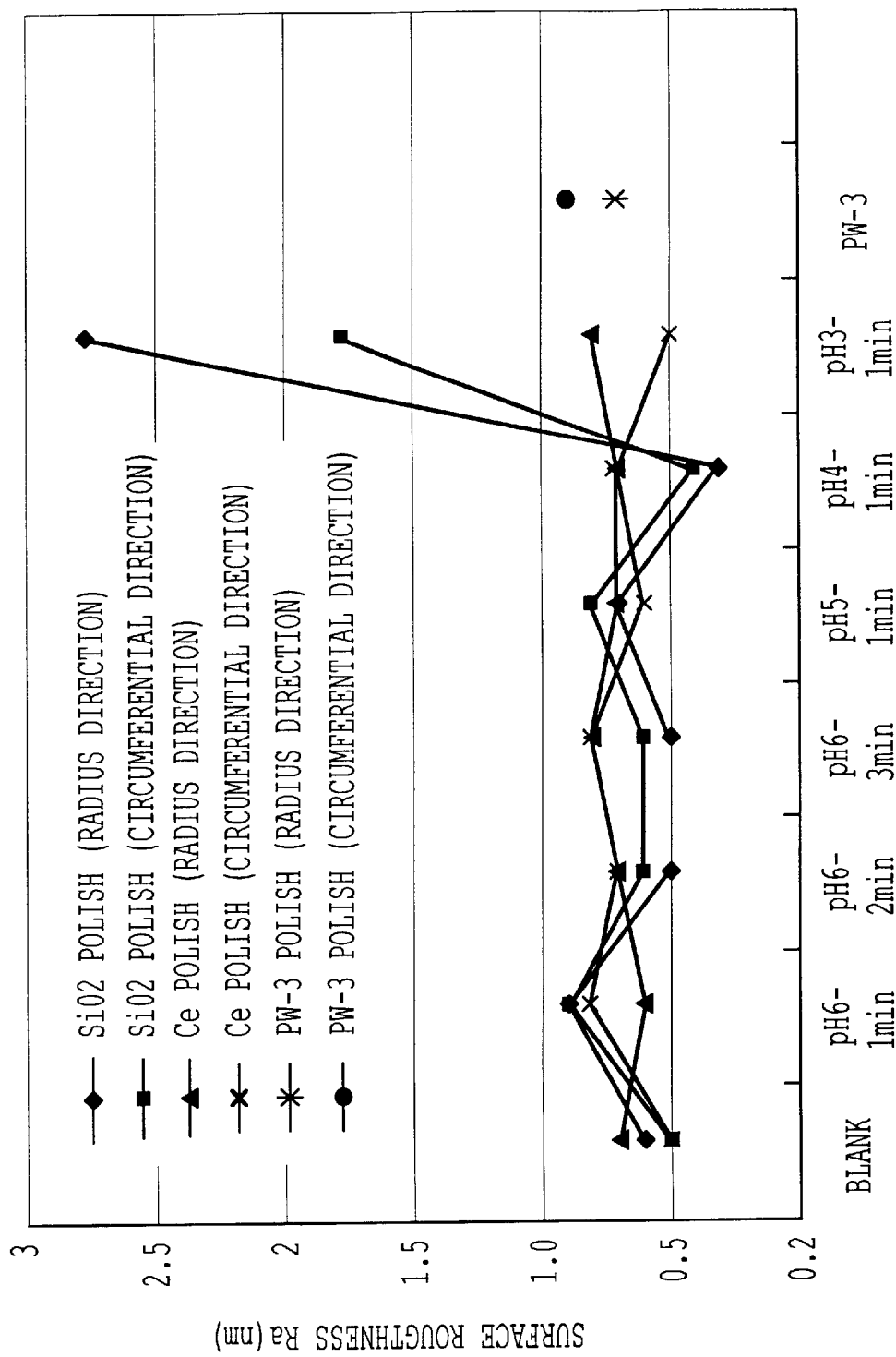

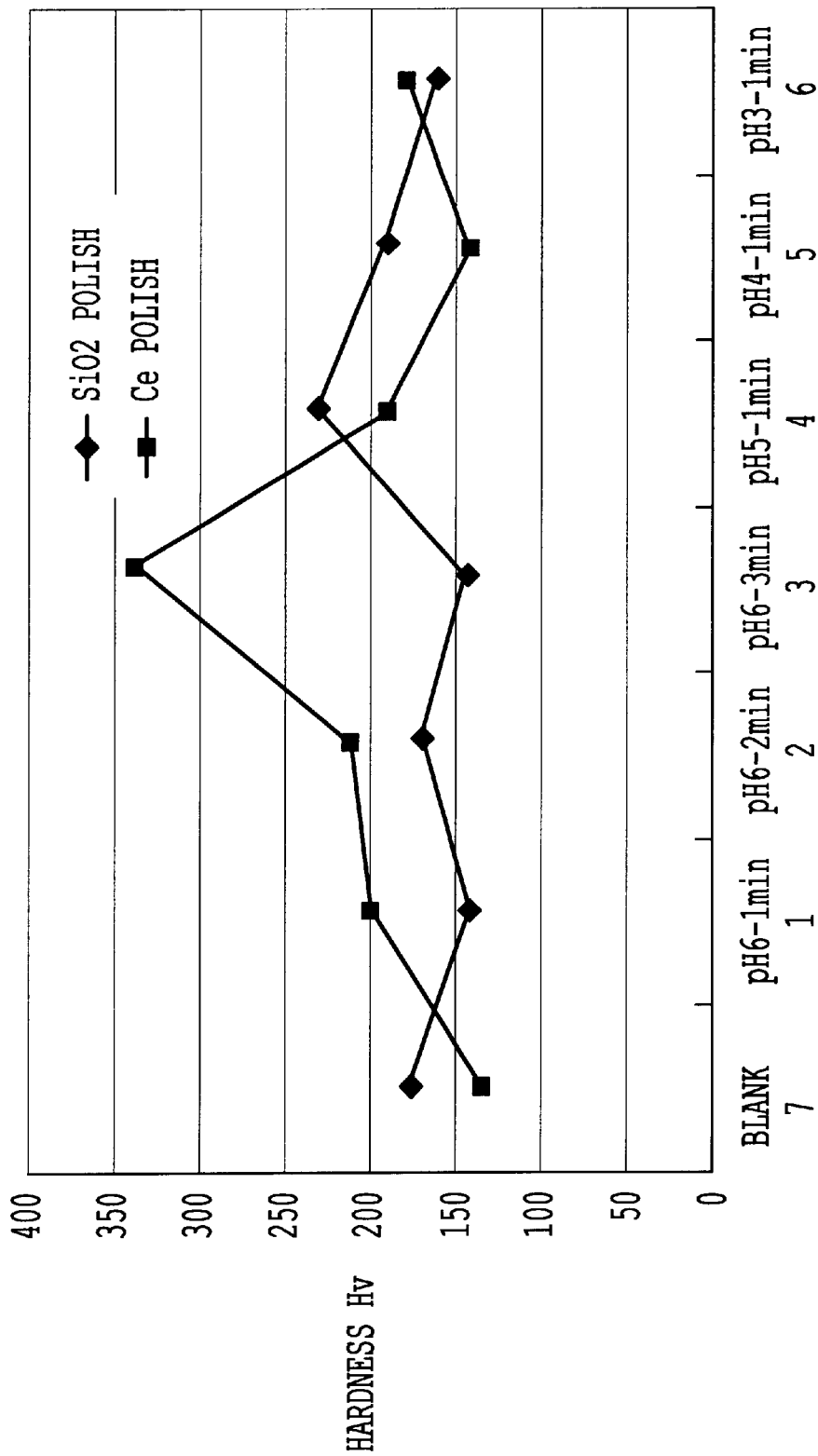

METHOD OF FINISHING GLASS SUBSTRATE

BACKGROUND OF THE INVENTION

1. Field of the Invention

The present invention relates to fabrication of a glass substrate. More particularly, the invention relates to an improvement of the surface properties of a glass substrate for a magnetic disk to form a hard disk which is used as a large scale recording medium in computers.

2. Description of the Background

Conventionally, although a substrate which is prepared from an aluminum alloy and the surface of which is plated with nickel, including a phosphor, has widely been used as a substrate for a magnetic disk, the demand for a glass substrate in such a role has been increasing in recent years, because of the necessities of small size hard disk drives, high recording densities of the disks, as well as low flying height of the magnetic head, promotion of impact strength and the like.

A glass substrate for a magnetic disk is required to have the properties of withstanding the centrifugal force caused by rotation of a disk drive and impact force which results upon collision of the substrate with a magnetic head and the like. Further, a glass substrate is required to have a preferred orientation of magnetic material on it so that the substrate has a sufficient S/N ratio.

In order to improve the above mentioned mechanical properties, the following two glasses are used which are a) chemically strengthened glass prepared by replacing Na of one of the glass ingredients with K and b) crystallized glass in which the fine crystals precipitate into the glass matrix and give rise to strain for strengthening the matrix.

As chemically strengthened glass is treated in an alkaline ion exchange process, the glass contains a significant amount of alkaline material in its surface. Since a gel material is formed on the glass surface during polishing, the hardness of the surface becomes weak, and the water present in glass is released during sputtering of a magnetic layer in a vacuum. This causes the magnetic layer to have a low orientation and a poor SIN ratio. Moreover, when the gel reacts with water and $CO_2$ gas, projections are formed on the surface of the glass disks. Therefore, the to conventional approach to cleaning glass substrates immediately before a medium fabrication step, is to clean the glass substrate with sulfuric acid and phosphoric acid solution immediately after chemical treatment of the glass to remove an alkaline component on the surface (Japanese Unexamined Patent Publication No. JP-A-9-22525). In this process alkaline components are removed, but since the oxidation activity is not sufficient to repair the structure of glasses, the surface hardness is low with the result that the surface corrodes. That is, as the glass structure of the Si—O combination is destroyed by the alkaline component present in the polishing solution, the surface hardness is still low and the magnetic layer which is formed after polishing has poor crystalline orientation. Besides, the conventional method of cleaning glass to remove alkali therefrom after polishing is not sufficient to prevent corrosion. Although it has been proposed to provide the glass surface with a silicon oxide coating by the alkoxide method after removing alkali, a heat treatment at more than 600° C. is necessary to form perfect the $SiO_2$ coating. This temperature is much higher than the strengthening point of 400 to 480° C., and it is not possible to form complete the $SiO_2$ coating.

Generally speaking, a glass structure of the Si—O combination, even in crystallized glass which does not contain alkali, is destroyed in mechanochemical polishing. Therefore, the surface of crystallized glass turns to a gel, as well as ion-strengthened glass, the orientation of magnetic layer formed on the gelled surface becomes random, and the resulting soft glass surface exhibits deteriorated corrosion resistance, as well as an anti-head impact property. A need, therefore, continues to exist for an improved method of strengthening the surface of glass while achieving improved corrosion resistance and anti-head impact properties of the surface.

SUMMARY OF THE INVENTION

Accordingly, one object of the present invention is to overcome the above-described problems, which include achieving corrosion resistance and anti-head impact property, of strengthened glass and crystallized glass which are employed for the fabrication of magnetic recording substrates and electric component mounting boards by conventional technology in order to achieve improvement of the properties of the glass surface and the orientation of magnetic layer which is formed on the glass surface.

Briefly, this object and other objects of the present invention as hereinafter will become more readily apparent can be attained by a method of cleaning a glass substrate, comprising contacting a preliminarily polished glass disk with ionized water of which the ORP potential is positive for a predetermined period of time in the last rinsing step in order to repair the structure of the glass so as to achieve higher surface hardness and improved corrosion resistance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a graph showing the relation between the pH of functional ionized water and surface roughness (Maximum value among 4 measurements);

FIG. 2 is a graph showing the effect of functional water (Result of ESCA measurement);

FIG. 3 is a graph showing the relation between depth from surface and hardness ratio;

FIG. 7 is a graph showing the results of tests for water release from glass substrates;

FIG. 8 is a graph showing surface roughness of substrates prepared under several polishing conditions and rinsing conditions; and FIG. 9 is a graph showing the relation of polishing conditions and hardness at 100 nm depth.

DETAILED DESCRIPTION OF THE PREFERRED EMBODIMENTS

Figure 4A:
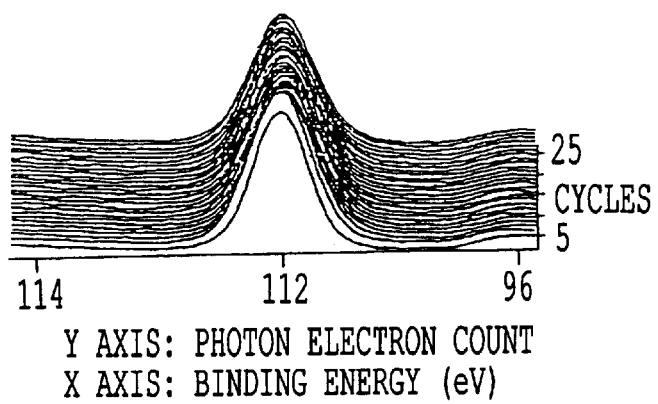
FIGS. 4a–4g are graphs showing binding energy and delta theta 50.
Figure 4B:
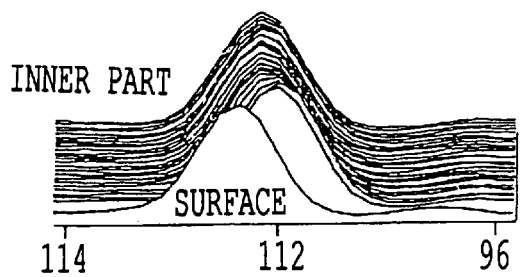
Figure 4C:
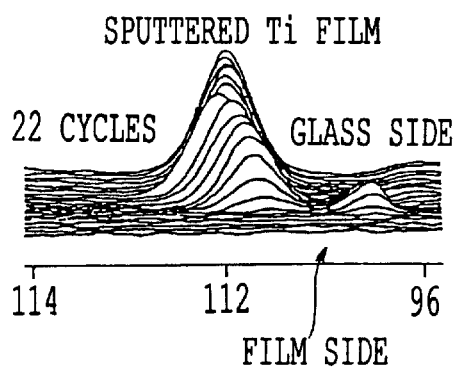
Figure 4D:
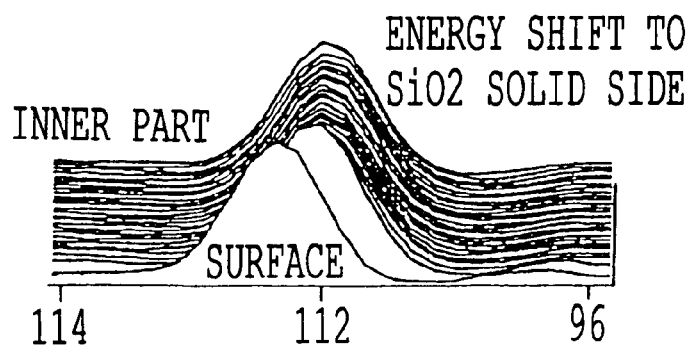
Figure 4E:
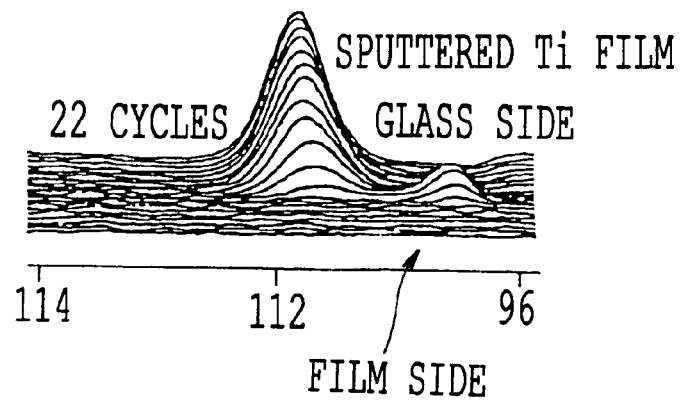
Figure 4F:
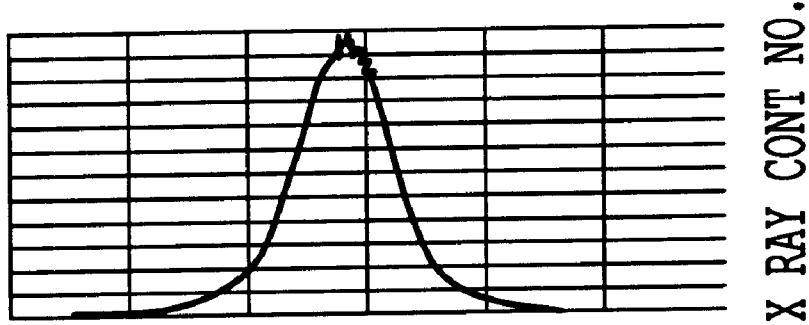
Figure 4G:
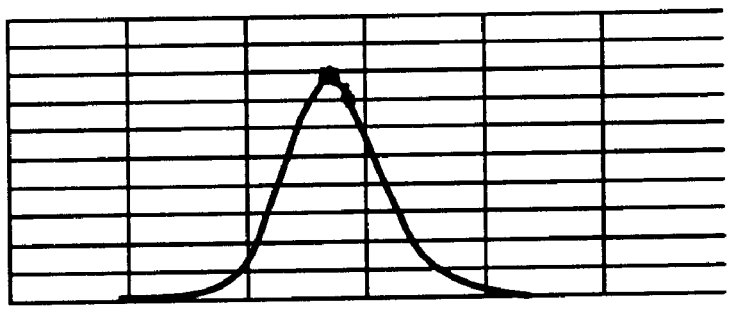

Conventionally, ionized water or gas-induced functional water have been used to rinse semiconductors and substrates for liquid crystal displays. However, these water materials are mainly used in the minus range of Oxidation Reduction Potential (ORP), i. e., on the alkaline side, to remove adherent particles. There is no report that ionized water or gas-induced functional water has been used as a rinse in order to improve corrosion resistance, hardness and crystal orientation which are necessary for magnetic recording substrates and electric component mounting substrates.

It has now been found that there is a relationship between ORP and the effects of surface improvement of a glass as shown in Table 1.

TABLE 1

| Improved property | Effective polarity of ORP |
| --- | --- |
| Removal of adhesive particles | negative for organic materials, positive for metals |
| Corrosion prevention | positive |
| Hardness | positive |
| Crystal orientation | positive |

In the present invention, it has been confirmed that, after removing adhesive particles on magnetic recording substrates and on electric components mounting substrates by ionized water at the negative ORP potential, treatment by ionized water having a positive ORP potential improves the properties of these substrates.

The present invention is a rinse of ionized water having a positive ORP potential wherein the rinsing is conducted for a predetermined period of time in the last rinse in order to repair the structure of glass, to harden the glass surface and to improve the anti-corrosion property of the glass.

After polishing, in the event removal of particles is necessary, a glass is rinsed in the ionized water at a positive or negative ORP potential, and, then, as mentioned above, the glass is again rinsed in the ionized water having a positive ORP potential.

It is sometimes not necessary to remove particles from the surface. In this case, the ORP potential preferably ranges from 300 to 1200 mV, and a preferred period of time for rinsing ranges from 1 to 10 minutes. By this treatment, the surface hardness and corrosion resistance of the glass substrates are improved, and the orientation of thin films formed on the substrates becomes better.

Generally, a polished glass substrate is treated, in the last rinsing step, with water having an ORP potential of −50 to −300 mV, and followed by treatment with water having an ORP potential of +300 to +600 mV for a period of 1 to 2 minutes.

By these rinsing treatment organic particles are removed from the glass surface, so that the glass surface become smoother, and the surface hardness of the glass and the orientation of thin film formed on the glass get better.

As to the functional ionized water itself, the water can be prepared by dissolving oxygen in water through an ozone penetrable membrane, or the water can be prepared by dissolving hydrogen in water through a hydrogen penetrable membrane. These gases dissolved in water have the same activity as electrolytically ionized water, but the cost of production is less than water prepared by electrolysis so that the water product of the invention has advantages economically and industrially. Electrolytically prepared ionized water can be used as an alternative to gas dissolved water.

The method of the present invention for finishing glass substrates comprises a) a rinsing process and b) an improved process at the last step after polishing. As to the rinsing process (a), adhesive dust (particles) on substrates are removed by the use of functional water having a positive or negative ORP potential. Upon using water having a negative potential, organic material particles on substrates are removed during the rinse. Upon using water having a positive potential, metallic particles are mainly removed from the glass surface. Ordinarily, after these rinsing steps, pure water rinsing is conducted in order to wash ionized water from the glass surface. In the event no particles are observed on a substrate, process a) is not necessary. That is, glass ordinarily has a negative electric polarity in water. Accordingly, when dust particles have a negative polarity, they do not cling to glass substrates.

In order to remove organic particles, the ORP of ionized water should be more than −300 mV to be effective. At an ORP below −300 mV, much alkali is present, and too much destruction of the glass structure occurs. Preferably, the range depends on the polishing conditions used or required, such as, the polishing agent employed, the polishing time (immersion time) and others. FIG. 8 shows the relation between polishing conditions and surface roughness. It shows that an immersion period of 1 to 3 minutes is preferred at pH 6 to 4, and that surface roughness becomes higher at pH 3.

In the next step b), substrates are treated in a water at a positive ORP potential in order to remove alkali component, especially Na, from the surfaces of substrates. At the same time, a gelatized Si—O combination is reformed by the oxidation activity of ionized water. Ordinarily, pure water rinsing and drying follow. In this process, deterioration of the surface of the substrate is repaired.

The effective ORP potential of functional water used to repair the surface of substrates ranges from +300 to +1200 mV. The more preferred range is from +300 to +600 mV. At more than +1200 mV, strong acid makes surfaces get rougher. The preferred range depends on the polishing conditions such as polishing agent, polishing time and others. FIG. 9 shows relation between polishing condition and hardness at 100 nm from the surface. In the case of $SiO_2$ polishing, rinsing at pH 5 for 1 minutes is preferred, and in the case of CeO polishing, rinsing at pH 6 for 3 minutes is recommended.

If necessary, the addition of ammonium chloride to control the pH of the ionized water and to increase the effect of ionized rinsing water is effective.

Having now generally described this invention, a further understanding can be obtained by reference to certain specific Examples which are provided herein for purposes of illustration only and are not intended to be limiting unless otherwise specified.

EXAMPLES

Example 1

(1) Glass Substrate

The glass substrate used in this Example is an ionic strengthened glass. Its composition is shown in Table 2.

TABLE 2

| Component | Concentration wt. % |
| --- | --- |
| $SiO_2$ | 62.0 |
| $Al_2O_3$ | 3.0 |
| $B_2O_3$ | 1.0 |
| $Na_2O$ | 9.0 |
| $K_2O$ | 9.0 |
| MgO | 3.0 |
| ZnO | 12.0 |

TABLE 2-continued

| Component | Concentration wt. % |
|---|---|
| $TiO_2$ | 0.6 |
| $As_2O_3$ | 0.2 |
| $Sb_2O_3$ | 0.2 |

(2) Strengthening Process

The ionic strengthening conditions are as follows.
heating temperature: 450° C.
heating time: 6.5 Hrs
strengthened depth: 50 μm (3) Last polishing Process After strengthening, glass substrates are polished with colloidal silica and $CeO_2$ as the last finishing step.

(4) Treatment with functional ionized water (last rinsing process) and its effect a) Improvement of surface roughness by using functional ionized water In order to improve surface roughness of the substrate, the substrate which has been subjected to final polishing is rinsed with functional ionized water to remove dust particles, and then rinsed with pure water in order to remove the dust particles by washing with ionized water. When functional ionized water is prepared, HCl and $NH_4OH$ are added to the anode chamber and the cathode chamber, respectively, of an electrolysis device. But at a pH of 6 (−400 mV ORP), nothing is added.

TABLE 3

| ORP (mV) | pH | Time (minute) |
|---|---|---|
| −370 | 9 | 1 |
| +400 | 6 | 1 |
| +560 | 5 | 1 |
| +680 | 4 | 1 |
| +830 | 3 | 1 |
| +1140 | 2 | 1 |

The conditions of treatment are shown in Table 3. The results of the treatment with functional water are shown in FIG. 1.

Surface roughness was measured by Talystep (made by Rank Taylor Hobson Co.). In the ORP range shown in Table 3, surface roughness was improved at 5 to 7 Angstroms compared with samples subjected to no ionized water treatment.

2) Removing the Alkali Component

Following the above treatment, substrates were contacted with ionized water having an ORP potential of 600 mV, pH 4.5 for 1 minute. Pure water rinsing and drying followed.

The alkali concentration was measured using a surface analyzer "ESCA" (made by Ulvac Phi Co.). The results are shown in FIG. 2. In FIG. 2 non-treated data are indicated in order to compare with their results. The concentration of Na decreases after treatment with ionized water.

3) Improvement of Surface Hardness

Surface hardness of samples prepared in the same condition as (2) was measured. FIG. 3 shows the result of hardness measurements. Hardness was measured by piercing specimens with a diamond cone. Data indicated in FIG. 3 are hardnesses to depths of 0.05, 0.01 and 1 μm. Hardness is recovered by ionized water treatment. At the depth of 1 μm the hardness is almost the same as that of bulk glass. This means that the thickness of the gelatized layer is 1 μm. In achieving reductions of track width and flying height, surface hardness is becoming more important. In order to endure impact by the GMR head, surface hardness is very important. From this view point as well, it is clear that functional ionized water treatment is effective on glass substrates.

4) Improvement of the Orientation of Magnetic Layer on a Glass Substrate

A sample rinsed in an ionized water having an ORP of 500 mV and a pH of 5 for 1 minute was examined. By this treatment a gelatized glass was recovered by the oxidation power of ionized water. The $SiO_2$ was restructured. FIG. 4 shows the relation between binding energy, delta theta 50 and ionized water treatment.

In FIGS. 4-a,b,c the vertical axis indicates the photoelectron count and the horizontal axis indicates binding energy. FIG. 4-a shows the results obtained for non-ionic strengthened and non-treated samples. FIG. 4-b shows the results of ionic strengthened, but non-ionized water treated glass. FIG. 4-c shows the results of ionic strengthening followed by functional water treatment. FIG. 4-a shows no shifting in the curves. However, in FIG. 4-b the curves shift in the higher energy direction, and the curves of FIG. 4-c shift in the lower energy direction. This means that the change of structure by strengthening was recovered by the ionized water treatment.

5) Corrosion Resistance

Figure 5:
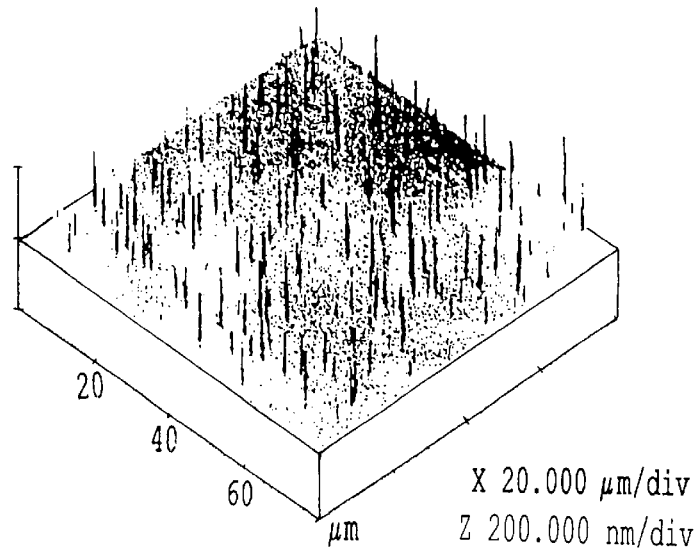
FIG. 5 is an AFM photograph showing the result of a corrosion test of a glass substrate not treated in functional ionized water.
Figure 6:
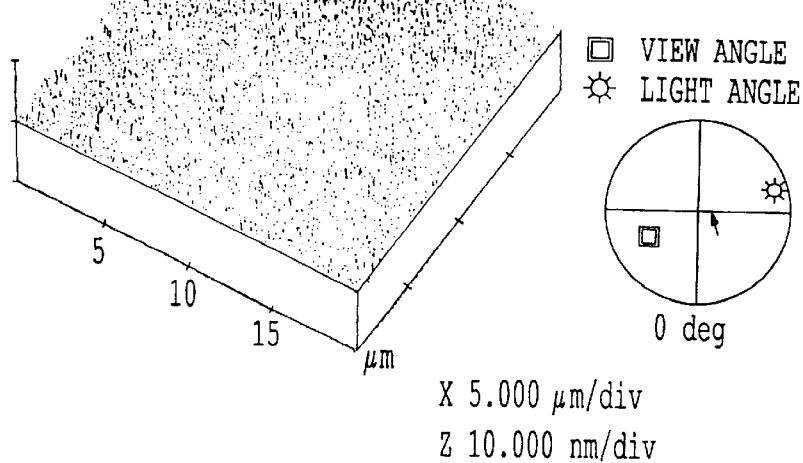
FIG. 6 is an AFM photograph showing the result of a corrosion test of a glass substrate treated in functional ionized water.

FIG. 5 and FIG. 6 are results of AFM observation. FIG. 5 shows the surface of a sample not treated with ionized water and after having been kept in a clean room for 1 month. Many projections are observed on the surface of the glass. On the other hand, FIG. 6 shows the surface of a sample after treatment with ionized water and after having been kept in a clean room for 6 months. No projections are observed. The vertical scales of FIG. 5 and FIG. 6 are 20 microns and 5 microns, respectively.

6) Amount of Water Released from Glasses

Glass samples were treated with ionized water (at ORP of +450 mV, for 1 minute) and non-treated glass samples were heated in a vacuum ($10^{-8}$ torr, temperature increase rate 10 degree/min, infrared heating). The former glass samples released $1.21 \times 10^{16}$ molecules (58.9 to 601.2 C) of water, and the latter glass samples released $1.86 \times 10^{16}$ molecules (59.6 to 59.9 C) of water. The difference in amount of released water is a significant difference. This seems to result from the fact that the amount of water in glass is reduced by repair of the glass structure.

As explained above, the present invention imparts effective properties to glass substrates.

The disclosure of Japanese priority application Serial Number 11-5296 filed Jan. 12, 1999 is hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A method of repairing $SiO_2$ bonding in a glass substrate, comprising the steps of:

providing a glass substrate previously subjected to a polishing step, said glass substrate having $SiO_2$ bonding therein and said $SiO_2$ bonding being damaged during said polishing step; and repairing the $SiO_2$ bonding on said previously polished glass substrate by contacting the glass substrate with ionized water having an OR potential of +300 to +1200 mV for a predetermined time.

2. The method of claim 1, wherein said predetermined time is from 1 to 10 minutes.

3. The method of claim 1, wherein the OR potential of the ionized water ranges from +300 to +600 mV.

4. The method of claim 1 wherein the treatment with ionized water occurs at a pH of 4–6.

5. A method of repairing $SiO_2$ bonding in a glass substrate, comprising the steps of:
   (a) providing a glass substrate previously subjected to a polishing step, said glass substrate having $SiO_2$ bonding therein and said $SiO_2$ bonding being damaged during said polishing step;
   (b) cleaning a surface of the glass substrate with ionized water having an OR potential ranging from −50 to −300 mV and then treating the surface with an ionized water having an OR potential of +300 to +600 mV, thereby removing particles which adhere to the surface of the glass substrate;
   (c) removing alkali components from said surface and repairing the $SiO_2$ bonding on said previously polished glass substrate by contacting the glass substrate with ionized water having an OR potential ranging from +300 to +600 mV; and
   (d) rinsing the repaired glass substrate with pure water and drying the glass substrate.

6. The method according to claim 5, wherein the ionized water having an OR potential of +300 to +600 mV has a pH ranging from 4–6.

* * * * *